3,542,737
POLYMERIC POLYESTERS CONTAINING ALKYL-
OR ALKENYLSUCCINIC ACIDS
Max H. Keck, Cuyahoga Falls, and John R. Wilson,
Akron, Ohio, assignors to The Goodyear Tire & Rubber
Company, Akron, Ohio, a corporation of Ohio
No Drawing. Filed July 5, 1968, Ser. No. 743,308
Int. Cl. C08g 17/00
U.S. Cl. 260—75      8 Claims

ABSTRACT OF THE DISCLOSURE

The invention relates to copolyesters of ethylene glycol, terephthalic acid and substituted succinic acids of the formula

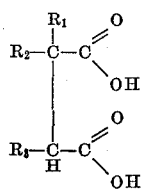

in which $R_1$ is a radical selected from alkenyl radicals and alkyl radicals and $R_2$ and $R_3$ are the same or different radicals selected from hydrogen, alkenyl and alkyl and the sum of the number of carbon atoms in $R_1$, $R_2$ and $R_3$ is at least 12. The copolyester resins have reduced melt viscosity as compared with polyethylene terephthalate and fibers of the resins have better dye receptivity.

---

This invention relates to new copolyester resins, to improved polyester filaments, films and other products produced therefrom.

Synthetic filaments of aromatic polyester resins are composed of relatively large linear molecules. In order for such filaments to have adequate yarn properties the resins from which they are made must be of high molecular weight. It has been found in general that the higher the molecular weight of the resin from which a filament is prepared the better the physical properties that can be induced in the filaments. Filaments of aromatic polyester resins such as polyethylene terephthalate are generally highly oriented crystalline structures that are more difficult to dye than are filaments or yarns made from natural fibers or regenerated cellulose or protein fibers. The oriented crystalline structure of the aromatic polyester fibers is not easily penetrated by water or by molecules of dyestuffs during conventional dyeing procedures.

Fabrics made from polyethylene terephthalate fibers can be dyed by dispersed dyestuffs at elevated temperatures in the range of from 120 to 130° C. at superatmospheric pressure. These temperatures are too high for certain natural fibers and fabrics of mixtures of polyester fiber with natural fibers may be damaged by such temperatures. Polyethylene terephthalate fibers can also be dyed with the assistance of a carrier to swell the fibers and allow penetration of the dyes. The use of carriers is undesirable because they are difficult to remove from the fibers and they may plasticize or soften polyester fibers and make them less serviceable. Furthermore, carriers swell the fibers and make them less resistant to the effects of dry cleaning solvents. In addition, the use of a carrier adds to the cost of dyeing because fibers dyed with the assistance of a carrier must be subjected to an additional treatment to remove absorbed carrier. It is desirable, therefore, for polyester fiber, particularly ones intended for blending with other fibers, to be dyeable at temperatures of about 100° C. or below without the use of a carrier.

It is an object of the invention to provide new copolyester resins suitable for spinning into fibers which may be dyed with disperse dyestuffs. It is another object of the invention to provide improved polyester fibers that can be dyed at relatively low temperature and that can be dyed without using a carrier to assist the dyeing. It is another object to provide new copolyester resins that have reduced melt viscosity. It is another object to provide copolyester resins suitable for the manufacture of high tenacity fibers. Still another object of the invention is to provide a process for making the copolyester resins.

It has unexpectedly been found that fibers made of copolyesters derived from ethylene glycol, terephthalic acid and substituted succinic acid in which the substituents contain at least 12 carbon atoms have greatly improved dye affinity. Such fibers can be dyed directly to deep shades without the assistance of a carrier. The copolyester resins have reduced melt viscosity as compared with polyethylene terephthalate and can be formed into fibers having high tenacity. The substituted succinic acids have the following general formula:

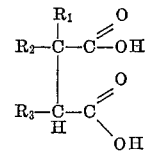

in which $R_1$ is a radical selected from alkenyl and alkyl radicals and $R_2$ and $R_3$ are the same or different groups selected from hydrogen, alkenyl and alkyl groups and the sum of the number of carbon atoms contained in $R_1$, $R_2$ and $R_3$ is at least 12. Thus when $R_2$ and $R_3$ are hydrogen, $R_1$ contains at least 12 carbon atoms. When $R_2$ and/or $R_3$ are alkyl or alkenyl, $R_1$ can contain less than 12 carbon atoms and the sum of the number of the carbon atoms in the substituents is at least 12 carbon atoms. Representative examples of alkenyl and alkyl radicals containing less than 12 carbon atoms are ethylene, propylene, the butylene, the amylene, the hexylene, the heptylene, the octylene, nonylene, decylene and undecylene and alkyl radicals such as methyl, ethyl, propyl, the butyl, the amyl, the hexyl, the heptyl, the octyl, nonyl, decyl and undecyl radicals.

Representative examples of long chain alkenyl radicals are dodecenyl, tridecenyl, tetradecenyl, pentadecenyl, hexadecenyl, octadecenyl, nonadecenyl, eicosenyl, heneicosenyl, docosenyl, triacontenyl and pentatriacontenyl.

Representative examples of long chain alkyl radicals are dodecyl, tridecyl, tetradecyl, pentadecyl, hexadecyl, eicosyl, heneicosyl, docosyl, triacontanyl and pentatriacontanyl.

It is convenient to use the substituted succinic anhydrides as a source of the succinic acids. These materials have the general formula

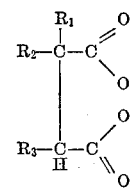

They can conveniently be prepared by reacting the proper olefin with maleic anhydride under heat and pressure in the presence of a small amount of hydroquinone to minimize polymerization of the maleic anhydride. The alkylated materials are prepared from the alkenyl derivatives by hydrogenating them in the presence of a suitable catalyst.

Representative examples of anhydrides of the acid compounds of the materials of the invention are:

n-dodecenyl succinic anhydride
n-tridecenyl succinic anhydride
n-tetradecenyl succinic anhydride
n-pentadecenyl succinic anhydride
n-hexadecenyl succinic anhydride
n-octadecenyl succinic anhydride
iso-octadecenyl succinic anhydride
n-eicosenyl succinic anhydride
n-heneicosenyl succinic anhydride
n-docosenyl succinic anhydride
n-dodecyl succinic anhydride
n-tridecyl succinic anhydride
n-tetradecyl succinic anhydride
n-pentadecyl succinic anhydride
n-hexadecyl succinic anhydride
n-octadecyl succinic anhydride
iso-octadecyl succinic anhydride
n-eicosyl succinic anhydride
n-heneicosyl succinic anhydride
2,2-dinonyl succinic anhydride
2,3-diheptyl succinic anhydride
2-decyl-3-propyl succinic anhydride
2-dodecyl-3-methyl succinic anhydride
2,3-didecyl succinic anhydride
2,3-dihexadecyl succinic anhydride
2,3-dihexyl-2-methyl succinic anhydride
2-decyl-3-tridecenyl succinic anhydride It will usually be desirable to use at least about 0.5 mol percent of the substituted succinic acid based on the mols of acid units in the copolyester. Fibers of copolyesters containing up to about 15 mol percent of the substituted succinic acid have good tenacity, improved affinity for disperse dyes and other desirable properties. Thus the copolyesters contain ethylene terephthalate units in the amount of from 99.5 to 85 percent of the sum of the ethylene terephthalate units and the ethylene substituted succinate units in the copolyester and correspondingly from 0.5 to 15 percent of said sum of the ethylene substituted succinate units. The preferred copolyesters contain ethylene terephthalate units to substituted succinate units in the ratios of from 97.5/2.5 to 90/10 with the most preferred containing the terephthalate to succinate units in ratios of from 97.5/2.5 to 92.5/7.5. The preferred resins are the copolyesters in which the succinate substituents are alkenyl or alkyl radicals containing from 16 to 18 carbon atoms.

The copolyesters of the invention can be obtained by reacting together ethylene glycol, terephthalic acid, and the substituted succinic acid or the substituted succinic anhydride or by reacting ethylene glycol with a mixture of ester forming derivatives of terephthalic acid and ester forming derivatives of the substituted succinic acid such as the lower alkyl esters and other recognized varieties.

In a preferred method of preparing the copolymers of the invention dimethyl terephthalate and ethylene glycol are reacted at a temperature of from 140° to 205° C. in the presence of catalyst such as manganese diacetate at atmospheric pressure. The desired quantity of the substituted succinic anhydride is then added and heating is continued at 200 to 220° C. to distill off the water formed in the esterification reaction of the succinic anhydride. When the theoretical amount of water has distilled, vacuum is gradually applied until a pressure of 1.0 torr is reached. Simultaneously the reaction temperature is gradually raised from about 220 to about 275° C. Glycol released in the condensation reaction is distilled out. When the desired melt viscosity is attained the copolymer melt is discharged from the reactor. Various catalysts can be used for the ester interchange reaction. Suitable catalysts are catalysts such as zinc acetate, lead acetate, manganese acetate and litharge. While it is not essential that a catalyst be added to the reaction mixture in the esterification reaction it will be obvious to those skilled in this art that certain esterification catalysts can be used to promote the esterification reaction. Representative examples of such esterification catalysts include soluble metal glycolates, alkoxides and salts of weak acids, tertiary amines and amphoteric metals.

Various catalysts can be used for the condensation reaction. Representative examples of suitable catalysts are antimony trioxide, litharge, glycol soluble compounds of titanium and glycol soluble compounds of cobalt.

In order to have good physical properties in the products it is necessary that the copolyesters have a high molecular weight, i.e., an intrinsic viscosity of at least 0.3, and preferably at least 0.5. Polyester filaments of these new copolyester resins have much improved dyeing properties. They can be dyed with dispersed dyestuffs without using a carrier to assist the dyeing. Various disperse dyes can be used. Representative examples of such dyes are Duranol Blue G, Dispersol Scarlet T, Dispersol F, Orange B, Duranol Br and Yellow Tr.

The following examples are set forth to illustrate the invention. In these examples parts and percentages are by weight unless otherwise indicated.

EXAMPLE 1

Preparation of 90/10 ethylene terephthalate/dodecenyl succinate 845 grams of dimethyl terephthalate, 744 grams of ethylene glycol, 0.288 gram of manganese diacetate and 0.288 gram of antimony trioxide were placed in a two liter, three-necked flask which was fitted with stirrer, thermometer and distillation accessories. The mixture was heated from 149 to 220° C. with stirring until the evolution of methanol was complete. Then 188 grams of dodecyl succinic anhydride were added and the reaction was continued at 200 to 210° C. until the water formed from the reaction of the anhydride with the glycol had distilled out. A portion of the product was then transferred to a one liter autoclave. Temperature and vacuum were slowly increased such that after about 1½ hours a temperature of 280° C. and a pressure of 1.9 torr were obtained. After an additional 30 minutes the viscous polymer was discharged from the autoclave. It had an intrinsic viscosity of 0.671 measured in a 60/40 phenol-tetrachloroethane solvent mixture at 30.0° C. The polymer was ground, dried and spun into a yarn by melt extrusion. This yarn was dyed with Latyl Blue 2R without a carrier. This yarn dyed considerably darker than ethylene terephthalate yarn which was dyed with a carrier.

EXAMPLE 2

Preparation of 95/5 polyethylene terephthalate/n-docosenyl succinate

A mixture of 46.05 grams of dimethyl terephthalate, 40 milliliters of ethylene glycol, 0.0138 gram of manganese acetate, and 0.0128 gram of antimony trioxide were placed in a glass reaction tube equipped with a stirrer and a side arm with a condenser and heated at 197° C. for 140 minutes during which time 17.5 milliliters of methanol distilled out. 5.08 grams of n-docosenyl succinic anhydride was then added and heating was continued for 60 minutes. The temperature was then raised to 244° C. and heating was continued for 20 minutes after which the pressure in the system was gradually reduced to 0.1 torr over a 10 minute period. The temperature was then raised to 280° C. and heating and stirring were continued for 75 minutes. The copolyester formed had an intrinsic viscosity of 0.762 measured in a 60/40 phenol-tetrachloroethane solvent mixture at 30.0° C.

EXAMPLE 3

Preparation of 95/5 polyethylene terephthalate/tetradecyl succinate 735.8 grams of dimethyl terephthalate, 620 grams of ethylene glycol, 0.220 gram of manganese diacetate and 0.220 gram of antimony trioxide were placed in a two liter, three-necked flask, which was fitted with stirrer, thermometer, and distillation side arm. The mixture was heated over a temperature range of from 152 to 208° C. with stirring until the evolution of methanol had ceased. Then 59.3 grams of tetradecyl succinic anhydride were added and the reaction continued at 200 to 210° C. until the water formed from the reaction of the anhydride with the glycol had distilled out. A portion of the product was then transferred to a one liter autoclave. The temperature of the autoclave gradually increased and the pressure reduced so that after about 45 minutes a temperature of 273° C. and a pressure of 1.0 torr were obtained. After an additional 40 minutes the polymer was discharged from the autoclave. It had an intrinsic viscosity of 0.618 measured in a 60/40 phenol-tetrachloroethane solvent mixture at 30° C.

All dyeings were run in the Launderometer in which reproducible dyeings had been previously obtained. Knitted fabrics made from fibers of the resin were introduced into dye solutions at 70° C. and the temperature raised to 98° C. Total dyeing time was 1.5 hours. The dye baths used were comprised as follows:

3.5% Duranol Blue G
21:1 Liquor: Fabric
2 Drops Duponol RA (wetting agent)

In all cases the fabrics were wet out first in 70° C. water for optimum leveling.

The dyed fabrics were given a post scour for 0.5 hour at 70° C. in the following bath:

0.1% Triton X-100
0.1% Soda ash
Water

Fibers made from resins of the invention can be prepared by melt extrusion and by spinning from solution in a suitable solvent. Such fibers can be oriented and are usually oriented by cold drawing. If desired, the fibers can be heat set by heating them at elevated temperature while maintaining them under tension according to known practices. The oriented heat set fibers of the invention have the improved dyeing properties, high tenacity, low elongation and other desirable properties. They are particualarly useful in textile applications including staple fiber blends containing about 25 to 65 percent by weight of copolyester staple fiber and 75 to 35 percent by weight of another staple fiber. Blends of low shrinkage fibers can be used in manufacturing apparel such as men's and ladies' suits, sportswear, underwear, sport shirts, sweaters and dresses. Other uses will be in the manufacture of slip covers, sheets, mattress coverings and upholstery. The low shrink staple to be mixed with the copolyesters of this invention may be such as cotton, silk, rayon, linen, wool, acrylic polymers and copolymers, nylon and polyester fibers such as polyethylene terephthalate and poly 1,4 cyclohexylene dimethylene terephthalate. Preferred blends are from 25 to 65 percent by weight of a copolyester of the invention with from 75 to 35 percent by weight of cotton and 25 to 65 percent by weight of a TABLE I.—COMPOSITION vs. DYE SHADE, DRAWN 4.4X, NOT HEAT SET

| Compositions* | Tenacity, g./d. | Elong., percent | Free shrink, percent | Drawn biref. | Fiber density | Dye shade |
|---|---|---|---|---|---|---|
| PET | 4.5 | 26 | 14 | .1438 | 1.350 | Very light. |
| ET/C$_{16-20}$ alkenyl succinate** | 4.2 | 22 | 18 | .1296 | 1.343 | Deep. |
| ET/tetradecyl succinate | 4.6 | 22 | 18 | .1323 | 1.336 | Do. |
| ET/dodecenyl succinate | 4.3 | 25 | 18 | .1261 | 1.345 | Medium. |
| ET/decyl succinate | 4.2 | 25 | 18 | .1307 | 1.348 | Light. |
| ET/octyl succinate | 4.1 | 30 | 17 | .1275 | 1.352 | Do. |
| ET/succinate | 4.0 | 27 | 14 | .1391 | 1.366 | Do. |

NOTE.—See footnotes at end of table I below.

TABLE II.—COMPOSITION vs. DYE SHADE, DRAWN 4.4X, HEAT SET (190° C. SHOE)

| Compositions* | Tenacity, g./d. | Elong., percent | Free shrink, percent | Drawn biref. | Fiber density | Dye shade |
|---|---|---|---|---|---|---|
| PET | 4.48 | 27.2 | 10 | .1430 | 1.367 | Light. |
| ET/C$_{16-20}$ alkenyl succinate** | 5.11 | 18.0 | 7 | .1266 | 1.363 | Medium. |
| ET/tetradecyl succinate | 5.72 | 16.3 | 6 | .1356 | 1.365 | Do. |
| ET/dodecenyl succinate | 5.12 | 15.8 | 6 | .1252 | 1.371 | Light. |
| ET/decyl succinate | 5.32 | 19.2 | 7 | .1284 | 1.370 | Do. |
| ET/octyl succinate | 4.60 | 20.1 | | .1308 | 1.369 | Do. |
| ET/succinate | 4.25 | 16.4 | | .1320 | 1.372 | Do. |

*All copolymers were 97.5/2.5 mol ratio=Ethylene terephthalate indicated comonomer.
**Mixture of substituted substituted succinic acids with alkenyl groups having carbon chains varying in length from 16 to 20 carbon atoms.
NOTE:
PET=Polyethylene terephthalate
ET=Ethylene terephthalate.
g./d.=Grams/denier.
Elong.=Elongation.
Biref.=Birefringence.

TABLE III.—EFFECT OF DRY CLEANING [1] ON IMPROVED DYEABILITY COPOLYMERS

| Composition* | Dry shade of fabric | Shade change | Copolymers "Perclene bleed" |
|---|---|---|---|
| ET/C$_{16-20}$ alkenyl succinate mixture** | Medium | None | Slight. |
| ET/tetradecyl succinate | do | do | Do. |

[1] Tests run in vials containing "Perclene" 0.5 hour at 46° C.
*All copolymers were 97.5/2.5 mol ratio=Ethylene terephthalate/indicated comonxmer.
**Mixture of substituted succinic acids containing alkenyl groups varying in length from 16 to 20 carbon atoms.
NOTE.—ET=Ethylene terephthalate.

copolyester of the invention with from 75 to 35 percent by weight of wool.

Blends of the low shrinkage fibers with fibers having high shrinkage characteristics are useful in making bulkable and bulky yarns, texturized fabrics and rugs.

Blends of the copolyester fibers with fibers having elastic properties are useful in stretch fabrics, sportswear, socks and in other applications where stretchable materials are required. Blends with elastic fibers such as Lycra are useful in stretch applications.

Blends can also be made of continuous filaments of copolyesters of this invention with continuous filaments of other materials or the blends can be blends of staple fibers as well as mixtures of continuous filament and staples. Such blends are useful for making bulkable composite yarns, bulky yarns, crimped fibers and fabrics. Blends of fibers having differential shrink characteristics are particularly useful in permanently creased garments, heat insulation fabrics, texturized fabrics, rugs and carpets.

The copolyesters of this invention are valuable film forming materials and films can be made from the copolyesters by melt extrusion or other suitable methods. Orientation or stretching improves properties of the films. Films and foils of the polyesters have good clarity and a brilliant luster. They are characterized by high tensile strength and low elongation, good age life and excellent electrical properties. They are particularly useful in packing applications, magnetic tapes, electrical insulation and other applications where high strength clear films are utilized. Films of the crystallizable copolyesters which contain from 2.5 to 15 mol percent of the ethylene succinate and from 97.5 to 85 mol percent of ethylene terephthalate can be prepared in amorphous state by super cooling hot amorphous film before crystallization occurs. Such films can be readily oriented by warming and then stretching. They can be heat set according to known procedures as by heating such films while they are held under tension. Where biaxial orientation is desired the films can conveniently be stretched in two directions at right angles to each other.

For some uses it is desirable to stretch the film in only one direction, as for example in the preparation of tapes for industrial uses. Stretching in one direction is readily accomplished by such methods as winding a film from one roll to another, the second roll rotating at a higher peripheral speed than the first roll. This stretching operation can be accomplished by methods familiar to those skilled in the art and is facilitated by warming the film by some suitable means just prior to the actual stretching of the film.

The ethylene terephthalate-ethylene substituted succinate copolyesters of the invention can contain small amounts up to 5 percent of units of other dicarboxylic acids or glycols. Examples of such other dicarboxylic acids are adipic, sebacic, azelaic and dodecane dioic acid. Examples of such other glycols are glycols such as tetramethylene glycol, pentamethylene glycol and hexamethylene glycol. Such modified copolyesters should contain a total of at least 85 molar percent of ethylene terephthalate units.

While the copolyesters will generally be used without further compounding they can be compounded with other materials if desired. Compatible resins, elastomers, pigments, flatting agents, dyes, plasticizers and other compounding ingredients can be added either by mixing the materials together on a suitable mill or other mixing apparatus, or by mixing in such compounding ingredients in solutions of the polyesters in a solvent.

While certain representative embodiments and details have been shown for the purpose of illustrating the invention it will be apparent to those skilled in this art that various changes and modifications may be made therein without departing from the spirit or scope of the invention.

What we claim is:

1. Film and fiber forming thermoplastic copolyesters consisting of units of ethylene glycol, terephthalic acid and at least one substituted succinic acid of the formula:

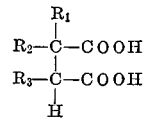

in which $R_1$ is a radical selected from the group consisting of alkenyl and alkyl radicals, $R_2$ and $R_3$ are selected from the same and different radicals selected from the group consisting of hydrogen, alkenyl and alkyl radicals and the sum of the number of carbon atoms contained in $R_1$, $R_2$, and $R_3$ is at least 12 joined through ester links in which the terephthalic acid units are present in the copolyester in the amount of from 85 to 99.5 percent of the sum of the mols of terephthalic acid units and substituted succinic acid units in the copolyester and the units of the substituted succinic acid are present in the amount of from 15 to 0.5 percent of the sum of the mols of terephthalic acid units and the substituted succinic acid units in the copolyester.

2. A copolyester according to claim 1 in which the terephthalic acid units are present in the copolyester in the amount of from 90 to 97.5 percent of the sum of the mols of terephthalic acid and substituted succinic acid units in the copolyester and the substituted succinic acid are present in the amount of from 10 to 2.5 percent of said sum.

3. A copolyester according to claim 2 in which $R_2$ and $R_3$ are hydrogen and $R_1$ is a radical selected from the group consisting of alkenyl and alkyl radicals containing at least 12 carbon atoms.

4. A copolyester according to claim 1 in which $R_2$ and $R_3$ are hydrogen and $R_1$ is selected from the group consisting of alkenyl and alkyl radicals containing from 16 to 18 carbon atoms.

5. A copolyester according to claim 2 in the form of a fiber.

6. A copolyester according to claim 3 in which $R_1$ is an alkenyl group containing at least 12 carbon atoms.

7. A copolyester according to claim 3 in which the terephthalic acid units are present in the copolyester in the amount of from 92.5 to 97.5 percent of the sum of the mols of terephthalic acid and substituted succinic acid units in the copolyester and the substituted succinic acid units are present in the copolyester in the amount of from 7.5 to 2.5 percent of said sum.

8. A copolyester according to claim 1 in the form of a film.

References Cited

UNITED STATES PATENTS

| | | | |
|---|---|---|---|
| 2,650,211 | 8/1953 | Dannenberg et al. | 260—75 |
| 2,760,948 | 8/1956 | Moffett et al. | 260—40 |
| 3,076,787 | 2/1963 | Johnson et al. | 260—75 |
| 3,390,108 | 6/1968 | Keck et al. | 260—7.5 |

FOREIGN PATENTS 665,595  1/1952  Great Britain.

HAROLD D. ANDERSON, Primary Examiner

M. GOLDSTEIN, Assistant Examiner